US010454893B2

(12) United States Patent
Bosco et al.

(10) Patent No.: US 10,454,893 B2
(45) Date of Patent: Oct. 22, 2019

(54) DATA PLANE PACKET PROCESSING TOOL CHAIN

(71) Applicant: VERISIGN, INC., Reston, VA (US)

(72) Inventors: John Bosco, Bluemont, VA (US); Dow Summers, Purcellville, VA (US); Kenneth Ryan, Vienna, VA (US)

(73) Assignee: VERISIGN, INC., Reston, VA (US)

( * ) Notice: Subject to any disclaimer, the term of this patent is extended or adjusted under 35 U.S.C. 154(b) by 30 days.

(21) Appl. No.: 15/295,670

(22) Filed: Oct. 17, 2016

(65) Prior Publication Data

US 2017/0034126 A1 Feb. 2, 2017

Related U.S. Application Data

(63) Continuation of application No. 13/536,169, filed on Jun. 28, 2012, now Pat. No. 9,473,455.

(60) Provisional application No. 61/502,504, filed on Jun. 29, 2011.

(51) Int. Cl.
*H04L 29/06* (2006.01)
*H04L 29/12* (2006.01)
*H04L 29/08* (2006.01)

(52) U.S. Cl.
CPC ...... *H04L 63/0227* (2013.01); *H04L 61/1511* (2013.01); *H04L 63/0236* (2013.01); *H04L 63/1458* (2013.01); *H04L 69/12* (2013.01); *H04L 69/32* (2013.01); *H04L 63/166* (2013.01); *H04L 63/168* (2013.01)

(58) Field of Classification Search
CPC .............................. H04L 69/12; H04L 69/13
See application file for complete search history.

(56) References Cited

U.S. PATENT DOCUMENTS

| | | |
|---|---|---|
| 6,330,659 B1 | 12/2001 | Poff |
| 7,020,696 B1 | 3/2006 | Perry et al. |
| 7,263,597 B2 | 8/2007 | Everdell et al. |
| 7,327,757 B2 | 2/2008 | Ghahremani et al. |
| 2003/0059200 A1 | 3/2003 | Cuijpers et al. |
| 2004/0148343 A1 | 7/2004 | Mottes |
| 2004/0250124 A1 | 12/2004 | Chesla et al. |

(Continued)

FOREIGN PATENT DOCUMENTS

| | | |
|---|---|---|
| WO | 1999/026122 | 5/1999 |
| WO | 2008/112769 A2 | 9/2008 |

OTHER PUBLICATIONS

Rummery, Audrey, International Search Report and Written Opinion for PCT Application No. PCT/US2012/044532, dated Dec. 11, 2012, from the European Patent Office, pp. 1-12.

(Continued)

*Primary Examiner* — Brandon S Hoffman
*Assistant Examiner* — Thong P Truong
(74) *Attorney, Agent, or Firm* — MH2 Technology Law Group, LLP

(57) ABSTRACT

This present disclosure relates to systems and methods for providing a data plane processing tool chain for processing packets that can use OSI layers 4 and above in the data plane without using a hypervisor. The disclosure has multiple processing capabilities, including: packet filtering, resolving DNS packets, generating packets, packet forwarding, performing DNS look up, time-stamping DNS packets, writing packets to disk, load-balancing, and protecting against DDOS attacks.

15 Claims, 5 Drawing Sheets

(56) References Cited

U.S. PATENT DOCUMENTS

| | | | | |
|---|---|---|---|---|
| 2007/0064610 | A1* | 3/2007 | Khandani | H04L 47/10 370/235 |
| 2008/0133300 | A1 | 6/2008 | Jalinous | |
| 2009/0240874 | A1* | 9/2009 | Pong | G06F 12/0223 711/105 |
| 2010/0106742 | A1 | 4/2010 | Guruswamy | |
| 2010/0192225 | A1* | 7/2010 | Ma | G06F 17/30985 726/23 |
| 2012/0033673 | A1* | 2/2012 | Goel | H04L 47/30 370/400 |

OTHER PUBLICATIONS

Mahdi Dashtbozorgi et al., "A High-Performance and Scalable Multi-Core Aware Software Solution for Network Monitoring," The Journal of Supercomputing, Kluwer Academic Publishers, BO, vol. 59, No. 2, Aug. 17, 2010, pp. 720-743.

Wind River Systems et al., "High-Performance Multi-Core Networking Software Design Options," White Paper, dated Mar. 11, 2012, pp. 1-13 (retrieved from the Internet: http://www.nltelecom.co.kr/2012/skin_board/k_build-Home/b_img_add/windriver/PerformanceDesignOptions_WP_1111.pdf, retrieved on Dec. 4, 2012), pp. 1-14.

Author Unknown, "Consolidating Communications and Networking Workloads onto one Architecture," White Paper, http://www.intel.com/content/dam/doc/white-paper/consolidating-networking-workload-onto-ai.pdf, 2010 Intel Corporation, pp. 1-10.

Yang Tao et al., "New System Approach to Network Platform Architecture," IDF 2011: Intel Developer Forum, Jan. 13, 2011, pp. 1-37.

Singapore Search Report (dated Jun. 30, 2015) and Written Opinion (dated Jul. 31, 2015), Singapore Application No. 2013094735, pp. 1-6.

Advantech, "Deep Packet Inspection", Retrieved from the Internet: http://www2.advantech.com.tw/networks-telecom/ApplicationDetail.aspx?doc_id=%7B800105F0-43E2-48F8-8464-BE80FB874A9, Sep. 9, 2010, pp. 1-3.

Japanese Office Action dated Feb. 9, 2016, Japanese Application No. 2014-518992, pp. 1-6 including Partial English Translation of Japanese Office Action.

Singapore Invitation to Respond to Written Opinion dated Mar. 17, 2016, Singapore Application No. 2013094735, pp. 1-6.

\* cited by examiner

DATA PLANE PACKET PROCESSING TOOL CHAIN

This application is a continuation of U.S. patent application Ser. No. 13/536,169, filed on Jun. 28, 2012, which claims priority to U.S. Provisional Patent Application No. 61/502,504, filed Jun. 29, 2011, each of which are incorporated by reference.

TECHNICAL FIELD

The present disclosure relates generally to systems and methods for providing a data plane processing tool chain for processing packets using OSI layers 4 and above in the data plane.

BACKGROUND

With the development of multi-core processors, applications no longer achieve regular performance improvements due to increases in clock speeds. Often, applications fail to take full advantage of the capabilities of system hardware. The Intel® Data Plane Development Kit (DPDK) was developed to take advantage of multi-core processor hardware. Because the data plane must run at such a high speed, however, the functions implemented in the data plane have been limited. For example, the DPDK is limited to lower-layer packet processing (Open Systems Interconnection ("OSI") layers 1-3) for performing simple services, such as packet forwarding. The DPDK does not support higher-level packet processing (OSI layers 4+) in the data plane. This is because adding these functions using the same technology will adversely impact packet processing performance.

To provide higher-level packet processing, some systems use a hypervisor (i.e., virtual machine manager) to run an isolated operating system that performs higher level packet processing. These solutions are inefficient, however, because they require the additional complexity, cost, and/or overhead of running a virtualized operating system. These conventional solutions also isolate data between operating system instances, which can cause problems when instances need to share data and/or system resources. Thus, tools for OSI layer 4 and above processing without needing a hypervisor are desirable for achieving greater efficiency and processing speed.

Systems and methods consistent with the present disclosure increase the speed of domain name system ("DNS") packet processing by leveraging the data plane. The present disclosure includes several embodiments. For example, in certain embodiments, systems and methods for providing an extended data plane packet processing tool chain are disclosed.

SUMMARY

Systems, methods, and computer-readable mediums are disclosed for processing packets in a data plane using OSI layer 4 and above. Consistent with exemplary embodiments, a method of processing a packet in the data plane may comprise reading a packet from a queue and processing the packet using OSI layer 4 and above using one or more poll mode drivers.

Consistent with further exemplary embodiments, a method of processing data packets may comprise one or more of filtering a DNS packet, wherein the filtering method may include filtering by source IP address, destination port, or wild card search of packet payload data; resolving a DNS packet; generating a packet in the data plane, wherein the type of packet generated may include a DNS query packet or a response packet; forwarding packets into network packet streams; performing a DNS look up; time-stamping a DNS packet; writing a packet to disk; load-balancing by assigning logical cores to data streams; or protecting against a distributed denial-of-service ("DDOS") attack.

Consistent with further exemplary embodiments, the method of processing data packets occurs without using a hypervisor because it does not run multiple operating systems. An application consistent with the present embodiment may run the method of processing data packets in a loop on an assigned logical core.

Consistent with other disclosed embodiments, systems or computer-readable media may store program instructions that are executable by one or more processors to implement any of the methods disclosed herein.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings.

DETAILED DESCRIPTION

Reference will now be made in detail to the present embodiments, examples of which are illustrated in the accompanying drawings. Wherever possible, the same reference numbers will be used throughout the drawings to refer to the same or like parts. While exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

Figure 1:
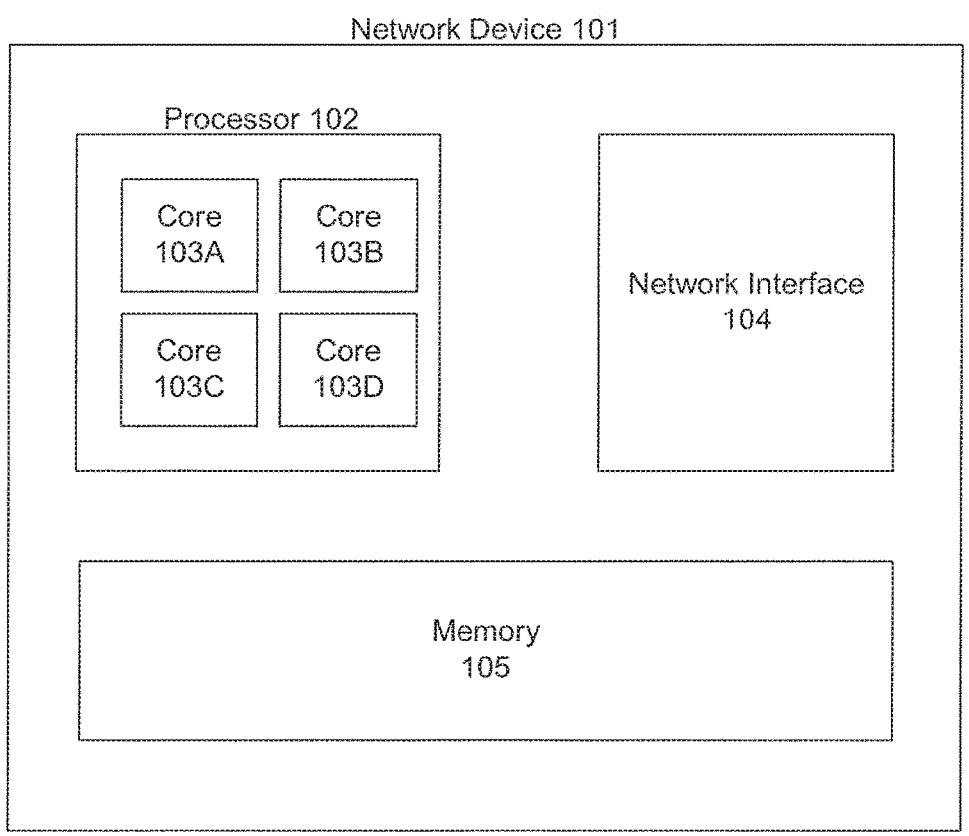
FIG. 1 is a diagram illustrating a system consistent with disclosed embodiments.

FIG. 1 depicts a system consistent with an embodiment of the current disclosure. One or more embodiments disclosed herein may be implemented using a computing device, such as network device 101. Exemplary network device 101 may logically be attached or include one or more processors 102.

In some embodiments, at least some of the processors may have one or more cores of varying core configurations and clock frequencies, such as cores 103A-D. The cores 103A-D may support one or more logical cores (not shown), sometimes called threads. To connect to the network, network device 101 may also include one or more network interfaces, such as network interface 104. Network interface 104 may be implemented using software and/or hardware, and may include a network interface card ("NIC") or may include a physical port. Network interface 104 may have one or more packet queues. For example, network interface 104 may include one or more RX queues and/or TX queues. For example, the network interface 104 may have multiple RX and TX queues for a single network port. The network device 104 may also include one or more memories 105 of varying clock frequencies and memory bandwidth. Memories 105 may include any device capable of storing digital data, such as RAMs, ROMs, solid state drives ("SSDs"), hard disk drives ("HDDs"), etc. While a single memory 105 is shown, the network may include multiple memories.

Figure 4:
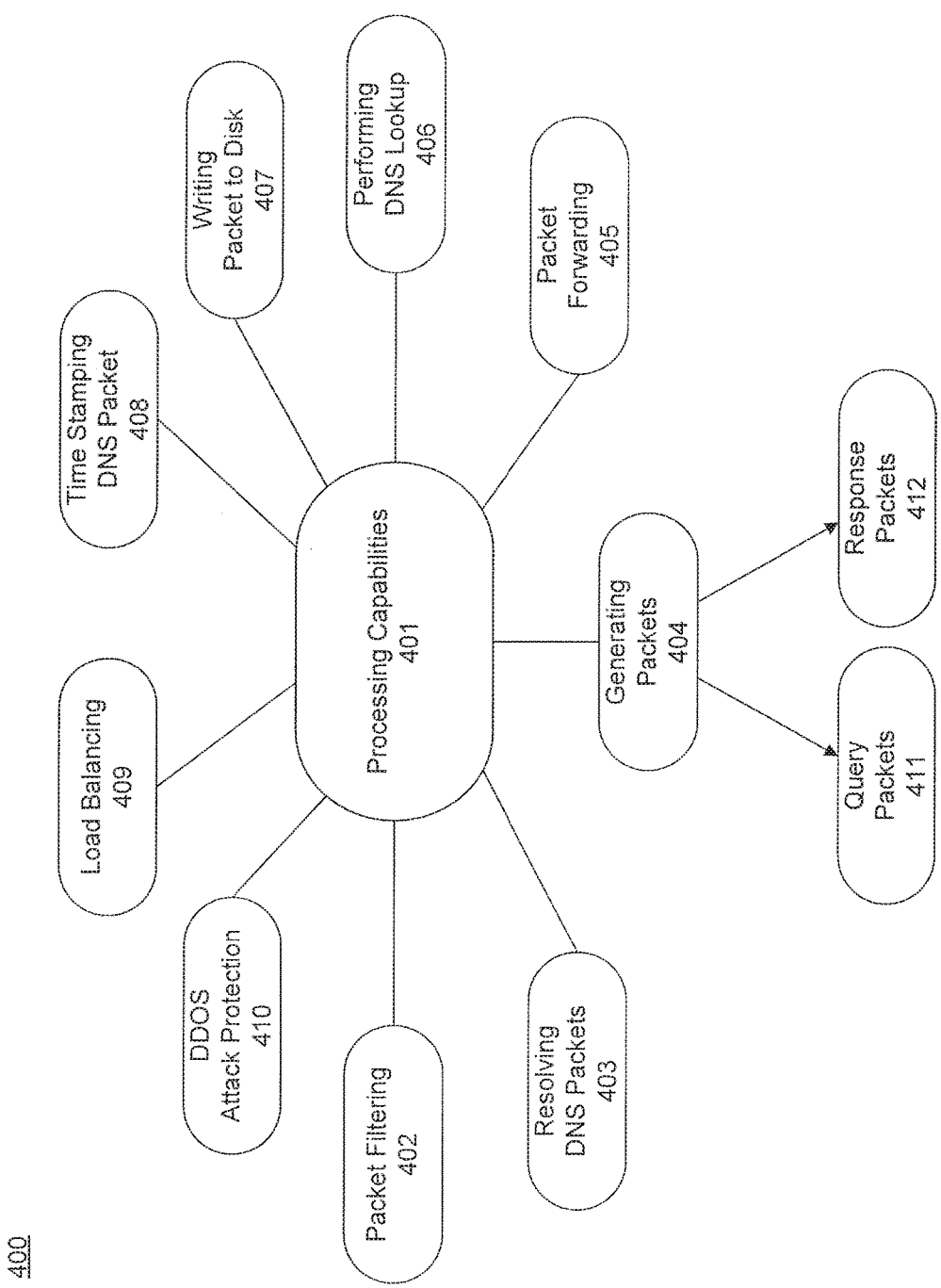
FIG. 4 is a relationship diagram illustrating exemplary processing capabilities, consistent with disclosed embodiments.

In one embodiment, a data plane packet processing tool chain is disclosed. The tool chain may include a set of libraries or functions for performing data plane packet processing not only on OSI layers 1-3 but also on OSI layers 4 and above. FIG. 4 is a relationship diagram illustrating the tool chain's processing capabilities, as illustrated by the outer ring 402-412. Each exemplary capability is explained in further detail through the following descriptions of disclosed embodiments.

In certain embodiments, the tool chain may include libraries that enable applications to perform packet filtering in the data plane. For example, packet filtering may include filtering packets based on a source or destination IP address, source or destination port, and/or a wildcard search of packet headers or payloads. In one embodiment, an application may use the packet filtering to identify DNS packets.

In another embodiment, the tool chain may include functions or libraries for implementing a data recorder. These functions or libraries may include, for example, functions that read up to 7 gigabits (9 million packets), or more, of data per second directly from the network and write the data to memory. In another embodiment, the tool chain may include functions or libraries to divide a single network packet stream into multiple streams, wherein each stream may be directed to a different data file. The tool chain may include functions or libraries that insure that all packets between two servers are directed to the same data stream. The tool chain may include functions or libraries to time-stamp packets with millisecond or greater accuracy. Unique timestamps on the packets may allow for the data files to be reconstituted into a single stream if needed.

The tool chain may include libraries or functions that generate packets in the data plane. In one embodiment, an application may generate DNS query packets. In another embodiment, the application may generate packets that respond to DNS queries. This may take place in OSI layer 6.

Figure 2:
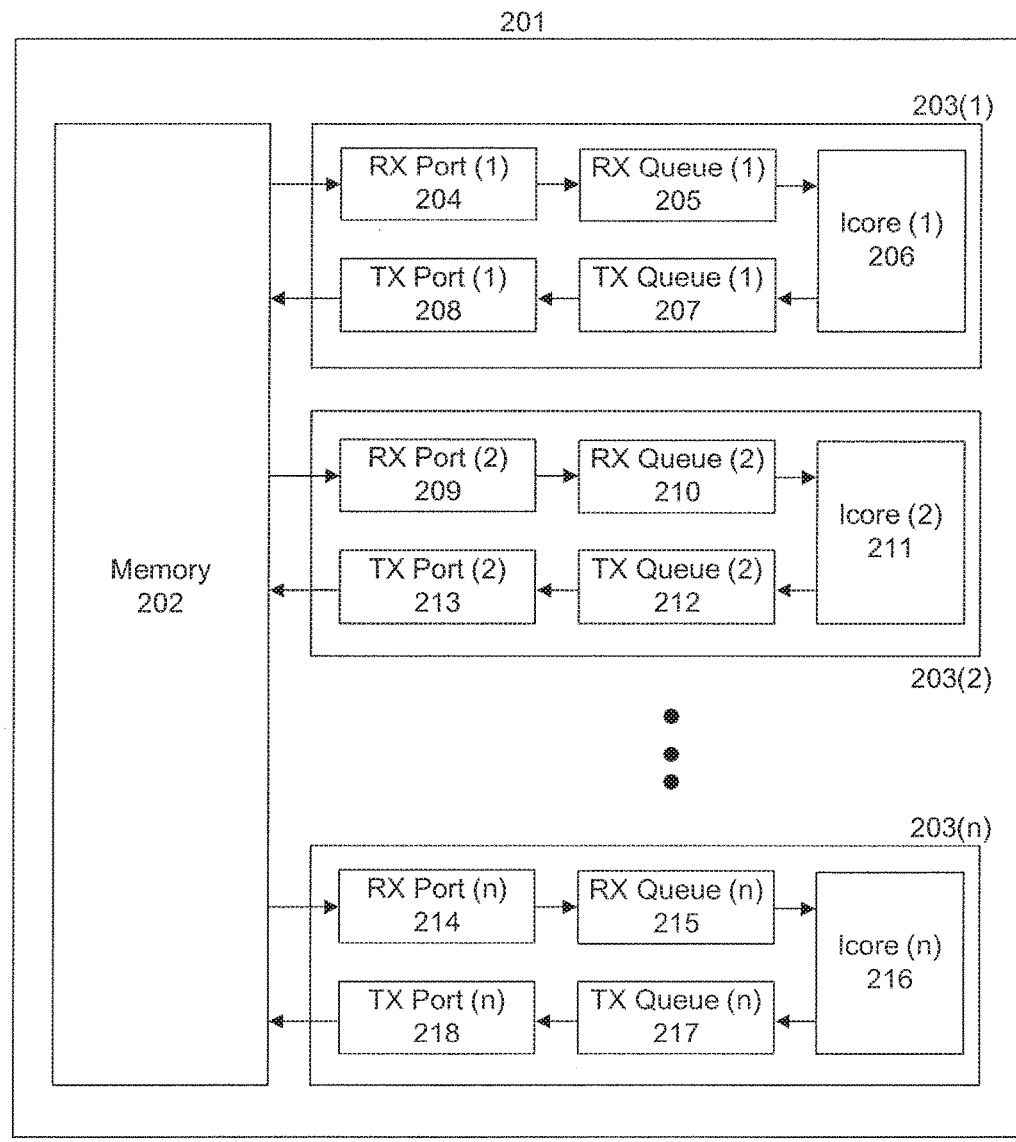
FIG. 2 is a diagram illustrating in detail a system consistent with an embodiment of the current disclosure to demonstrate load balancing.

In an additional embodiment, the tool chain may include libraries or functions that perform load balancing. FIG. 2 depicts a system consistent with an embodiment of the current disclosure. Load balancing may include assigning one or more logical cores, such as Icore(1) through Icore(n), or RX/TX queue pairs, such as RX Queue(1) through RX Queue(n) and TX Queue(1) through TX Queue(n), per network port, such as RX Port(1) through RX Port(n) and TX Port(1) through TX Port(n). Additionally, the load balancing may include assigning logical cores from different cores 103A-D to the one or more RX/TX queue pairs for a network port.

Figure 5:
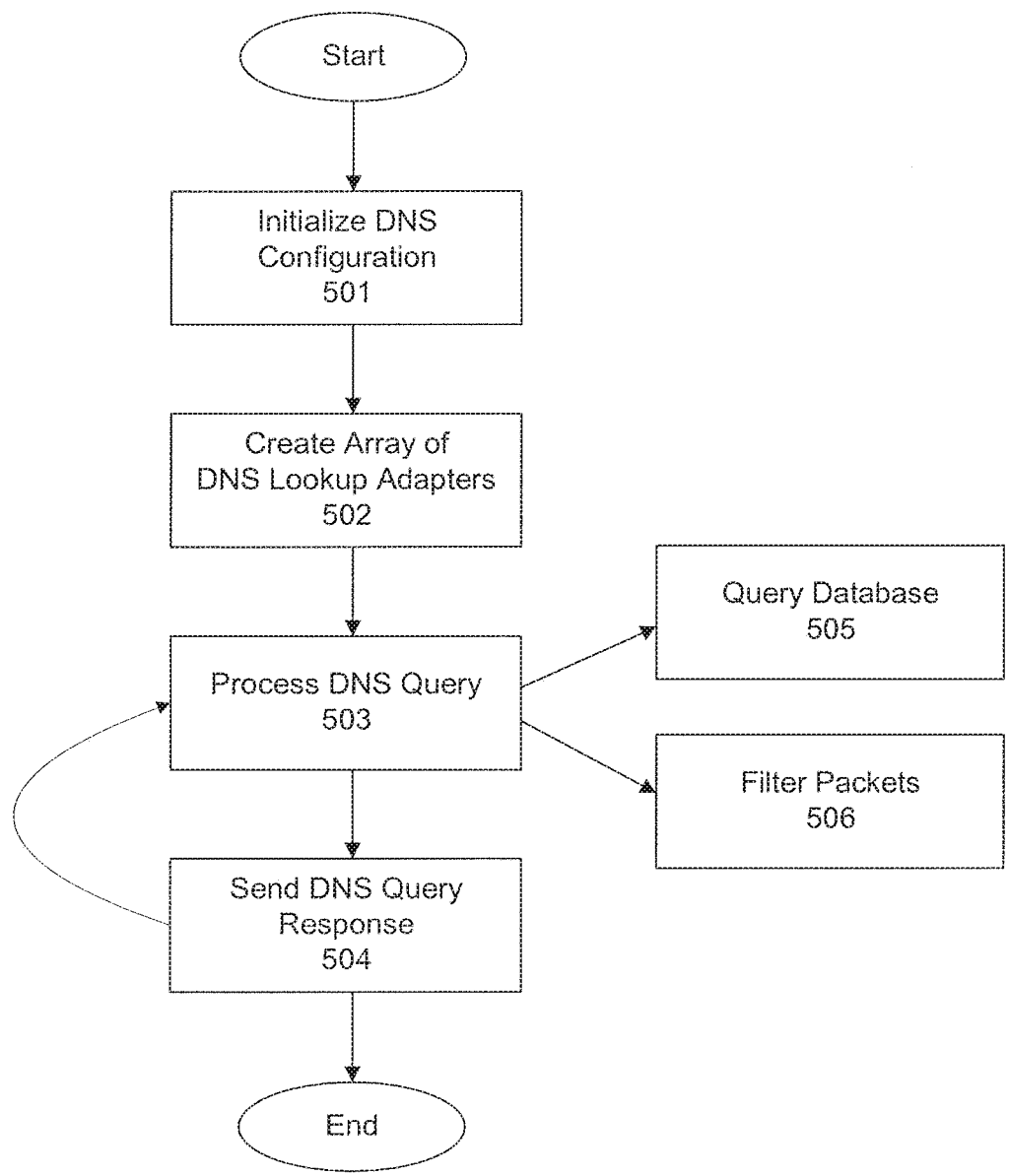
FIG. 5 is a flow diagram illustrating an exemplary process for performing a DNS look up, consistent with disclosed embodiments.

The memory 105 may store one or more applications that include one or more of the aforementioned functions or libraries, or any combination thereof. For example, an application may perform a DNS look up, as depicted in FIG. 5. A DNS look up may include a run-once routine that initializes a DNS configuration, as in step 501. In step 502, the application may create an array of DNS lookup instances. In step 503, the application may execute a process query method in an assigned DNS lookup instance. These methods may resolve a DNS query by querying one or more databases storing DNS information, as in option 505. The application may also use the packet filtering to identify DNS packets that need to be resolved in option 506. Finally, in step 504, the application may generate a response packet that includes a response to the DNS query. Steps 503 through 506 may repeat in a loop without repeating steps 501 or 502. This may take place in OSI layer 6.

In certain embodiments, the applications perform these functions, as well as functions for OSI layer 4 and above, in the data plane. In other words, these applications perform OSI layer 4 and above functions without the need for an operating system or hypervisor. Accordingly, these applications can share memories and information without the need to perform specific globalization functions. Additionally, the applications operate without the overhead of running multiple operating systems.

Figure 3:
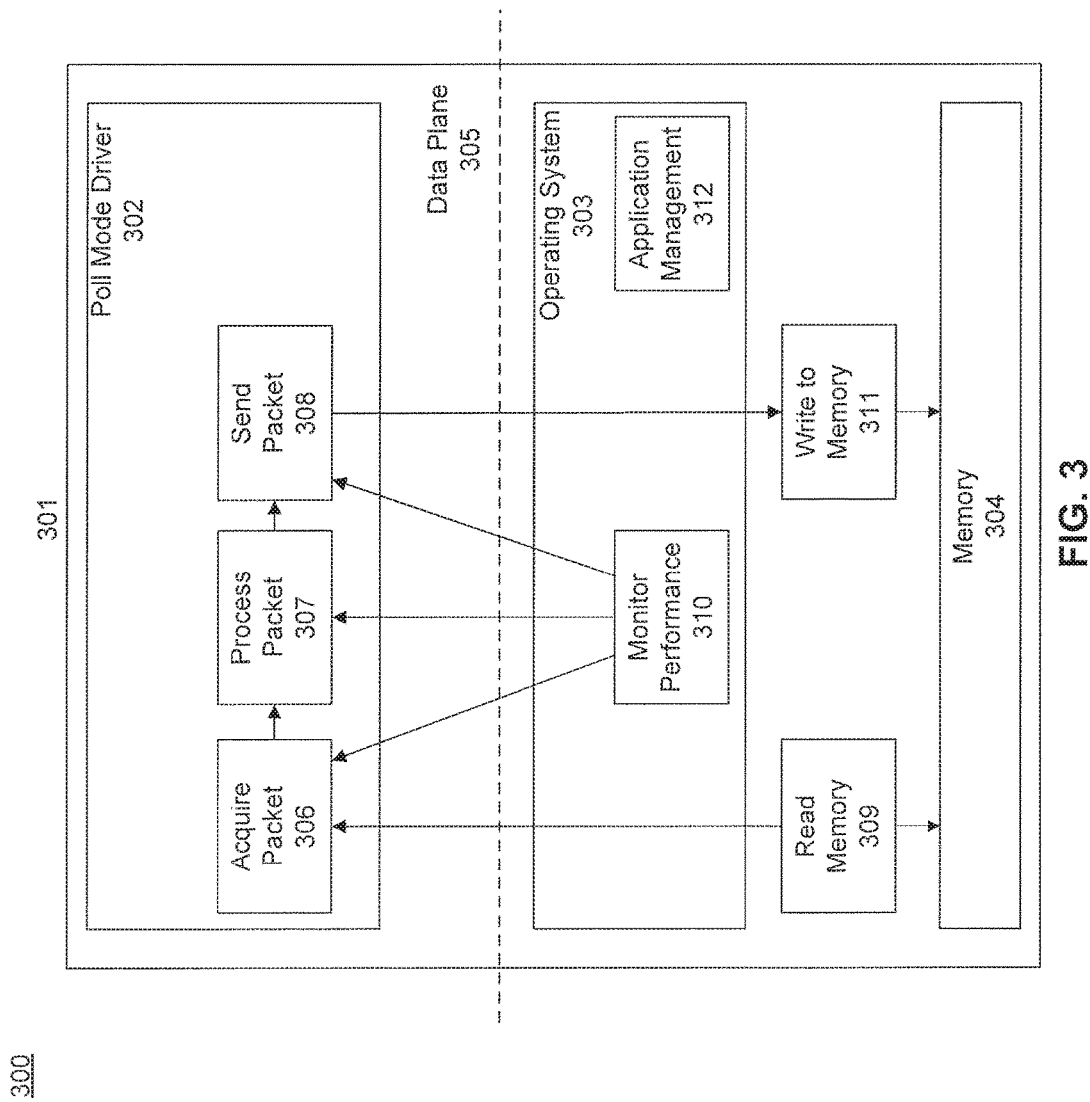
FIG. 3 is a flow diagram illustrating an exemplary process for dividing processor duties between a poll mode driver and operating system when run in userland mode, consistent with disclosed embodiments.

In certain embodiments, these applications may be operated in a userland mode. FIG. 3 illustrates the functionality of a poll mode driver and an operating system in userland mode as consistent with disclosed embodiments. In userland mode, the applications, such as application 301, may be implemented using one or more poll mode drivers, such as 302, and an operating system, such as 303. By way of example, the operating system may be Microsoft Windows™, Unix™, Linux™, Solaris™, or some other operating system. In this mode, the poll mode drivers may acquire and send packets to and from the data plane. FIG. 3 illustrates an exemplary process consistent with this embodiment where a poll mode driver 302 acquires a packet from an operating system in step 306, processed the packet in step 307, and sends the packet in step 308. The operating system, however, such as operating system 303, may access memory shared with the applications, such as memory 304, including reading from memory in step 309 and writing to memory in step 311. Accordingly, the operating system may be used to monitor the performance of the applications running in the data plane and/or the poll mode drivers, as in step 310. Additionally, as in step 312, the operating system may be able to provide management functions for the applications running in the data plane.

Alternatively, in certain embodiments, an application may be operated in a bare-metal mode. In bare-metal mode, the application may eliminate the need for an operating system by running as an executable byte code. Features like disk-drive support are left to the user to implement.

In another embodiment, the tool chain may include functions or libraries for protecting against a DDOS attack. These functions or libraries may include, for example, functions that identify a DDOS attack and/or establish a pipeline based on the identification of a DDOS attack to protect against it. These functions or libraries may use a single security appliance to read the data once by the data plane and may operate on the packets N number of times. The packets then may continue through the system or exit the system.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, where the described implementation includes software, the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system.

The embodiments described herein are exemplary only, and it will be apparent to those skilled in the art that various modifications and variations can be made in the disclosed systems and processes without departing from the scope of the invention. For example, embodiments may be practiced using some or all of the features discussed herein. Other embodiments will be apparent to those skilled in the art from consideration of the specification and practice of the invention disclosed herein. It is intended that the specification and examples be considered as exemplary only, with a true scope and spirit being indicated by the following claims and their full scope equivalents. Further, it should be understood that, as used herein, the indefinite articles "a" and "an" mean "one or more" in open-ended claims containing the transitional phrase "comprising," "including," and/or "having."

What is claimed is:

1. A method, comprising:
    reading, using a poll mode driver, a first Domain Name System (DNS) packet from a first queue of a network interface card, wherein the first DNS packet is a DNS query packet;
    sending, using the poll mode driver, the first DNS packet to a data plane;
    processing the first DNS packet in the data plane, wherein processing the first DNS packet comprises querying a database storing DNS information;
    generating, in the data plane, a second DNS packet in response to processing the first DNS packet, wherein the second DNS packet is a DNS response packet corresponding to the DNS query packet; and
    sending, using the poll mode driver, the second DNS packet from the data plane to a second queue of the network interface card.

2. The method of claim 1, wherein the first queue is an RX queue.

3. The method of claim 1, wherein the second queue is a TX queue.

4. The method of claim 1, wherein processing the first DNS packet further comprises performing packet filtering in the data plane.

5. The method of claim 4, wherein the packet filtering comprises:
    identifying a source Internet Protocol (IP) address or destination port for the first DNS packet; and
    filtering the first DNS packet based on the identified source IP address or destination port.

6. The method of claim 1, wherein processing the first DNS packet occurs independently of a hypervisor.

7. The method of claim 1, wherein processing the first DNS packet occurs independently of an operating system.

8. A system, comprising:
    a processor; and
    a memory coupled with the processor, wherein the memory is configured to provide the processor with instructions which when executed cause the processor to perform operations comprising:
        reading, using a poll mode driver, a first Domain Name System (DNS) packet from a first queue of a network interface card, wherein the first DNS packet is a DNS query packet;
        sending, using the poll mode driver, the first DNS packet to a data plane;
        processing the first DNS packet in the data plane, wherein processing the first DNS packet comprises querying a database storing DNS information;
        generating, in the data plane, a second DNS packet in response to processing the first DNS packet, wherein the second DNS packet is a DNS response packet corresponding to the DNS query packet; and
        sending, using the poll mode driver, the second DNS packet from the data plane to a second queue of the network interface card.

9. The system of claim 8, wherein the first queue is an RX queue.

10. The system of claim 8, wherein the second queue is a TX queue.

11. The system of claim 8, wherein processing the first DNS packet further comprises performing packet filtering in the data plane.

12. The system of claim 11, wherein the packet filtering comprises:
    identifying a source Internet Protocol (IP) address or destination port for the first DNS packet; and
    filtering the first DNS packet based on the identified source IP address or destination port.

13. The system of claim 8, wherein processing the first DNS packet occurs independently of a hypervisor.

14. The system of claim 8, wherein processing the first DNS packet occurs independently of an operating system.

15. A non-transitory computer-readable medium storing instructions that, when executed by at least one processor of a computing system, cause the computing system to perform a method, comprising:
    reading, using a poll mode driver, a first Domain Name System (DNS) packet from a first queue of a network interface card, wherein the first DNS packet is a DNS query packet;
    sending, using the poll mode driver, the first DNS packet to a data plane;

processing the first DNS packet in the data plane, wherein processing the first DNS packet comprises querying a database storing DNS information;

generating, in the data plane, a second DNS packet in response to processing the first DNS packet, wherein the second DNS packet is a DNS response packet corresponding to the DNS query packet; and sending, using the poll mode driver, the second DNS packet from the data plane to a second queue of the network interface card.

* * * * *